(12) United States Patent
Kalandek et al.

(10) Patent No.: US 8,007,002 B2
(45) Date of Patent: Aug. 30, 2011

(54) AIR BAG WITH FILL HOSE AND METHOD OF ASSEMBLY

(75) Inventors: Bruce A. Kalandek, Dearborn, MI (US); James A. Horton, Knoxville, TN (US)

(73) Assignee: Key Safety Systems, Inc., Sterling Heights, MI (US)

( * ) Notice: Subject to any disclaimer, the term of this patent is extended or adjusted under 35 U.S.C. 154(b) by 242 days.

(21) Appl. No.: 12/188,130

(22) Filed: Aug. 7, 2008

(65) Prior Publication Data
US 2009/0051149 A1 Feb. 26, 2009

Related U.S. Application Data

(60) Provisional application No. 60/957,001, filed on Aug. 21, 2007.

(51) Int. Cl.
*B60R 21/217* (2006.01)
*B60R 21/23* (2006.01)

(52) U.S. Cl. ............ 280/740; 280/728.2; 280/742; 280/743.1

(58) Field of Classification Search .......... 280/740, 280/730.2, 728.2, 742, 729, 743.1
See application file for complete search history.

(56) References Cited

U.S. PATENT DOCUMENTS

| | | | | |
|---|---|---|---|---|
| 4,006,918 A * | 2/1977 | MacFarland | ................ | 280/729 |
| 5,098,125 A * | 3/1992 | Thornton et al. | ......... | 280/743.1 |
| 5,213,363 A * | 5/1993 | Fukumori et al. | ......... | 280/743.1 |
| 5,632,506 A * | 5/1997 | Shellabarger | ............. | 280/743.1 |
| 5,863,068 A * | 1/1999 | Breed | ........................ | 280/743.1 |
| 5,944,342 A * | 8/1999 | White et al. | ................. | 280/729 |
| 6,530,595 B2 * | 3/2003 | Masuda et al. | ............ | 280/730.2 |
| 6,827,368 B2 * | 12/2004 | Jang et al. | ..................... | 280/729 |
| 7,686,327 B2 * | 3/2010 | Heuschmid et al. | ......... | 280/729 |
| 2003/0218324 A1 * | 11/2003 | Ju et al. | ..................... | 280/743.1 |
| 2004/0104561 A1 * | 6/2004 | Maertens | .................. | 280/730.2 |
| 2005/0248132 A1 * | 11/2005 | Wheelwright | ............... | 280/729 |
| 2007/0228709 A1 * | 10/2007 | Khouri | .......................... | 280/740 |

* cited by examiner

*Primary Examiner* — Toan C To
*Assistant Examiner* — George D. Spisich
(74) *Attorney, Agent, or Firm* — Markwell Seitzman

(57) ABSTRACT

An air bag module (60) including an inflatable air bag (50) having a first region formed by opposing edge borders (102, 104) of two facing panels or panel pieces (52, 54), the first region initially open to receive a gas distribution hose (40), the gas distribution hose comprising a tubular portion (42) and a flat portion (44) integrally formed with the tubular portion, the tubular portion configured to receive inflation gas at one portion and having openings (49) therein to permit the egress of inflation gas; the flat portion of the hose located between the opposing edge borders of the facing panels; and a seam or seams (110) extending through the facing borders to join the flat portion of the hose between the facing edge borders in a gas tight manner.

2 Claims, 9 Drawing Sheets

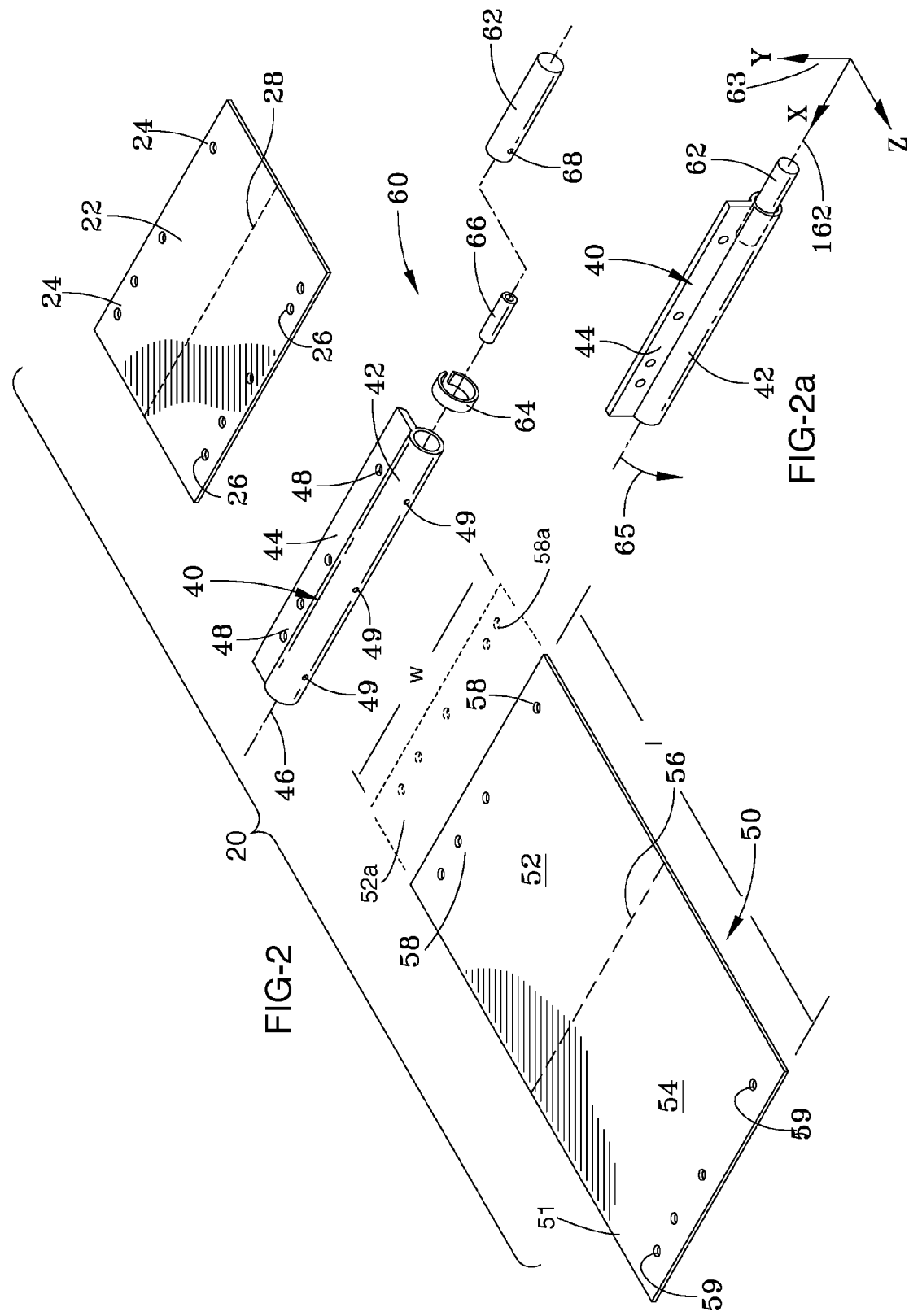

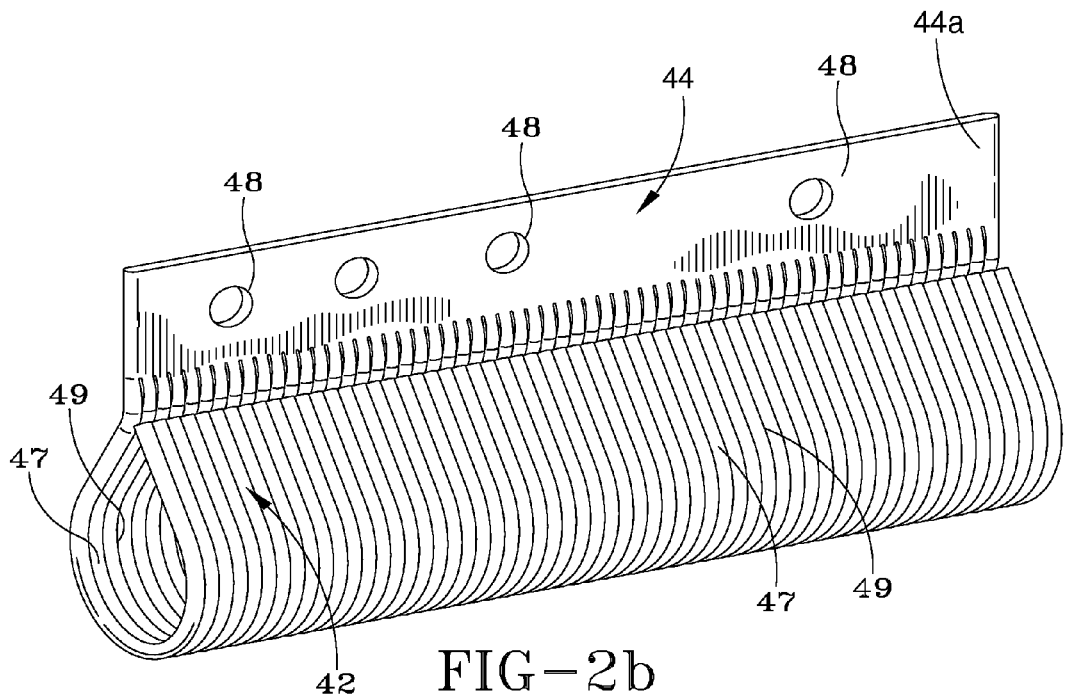
FIG-2b
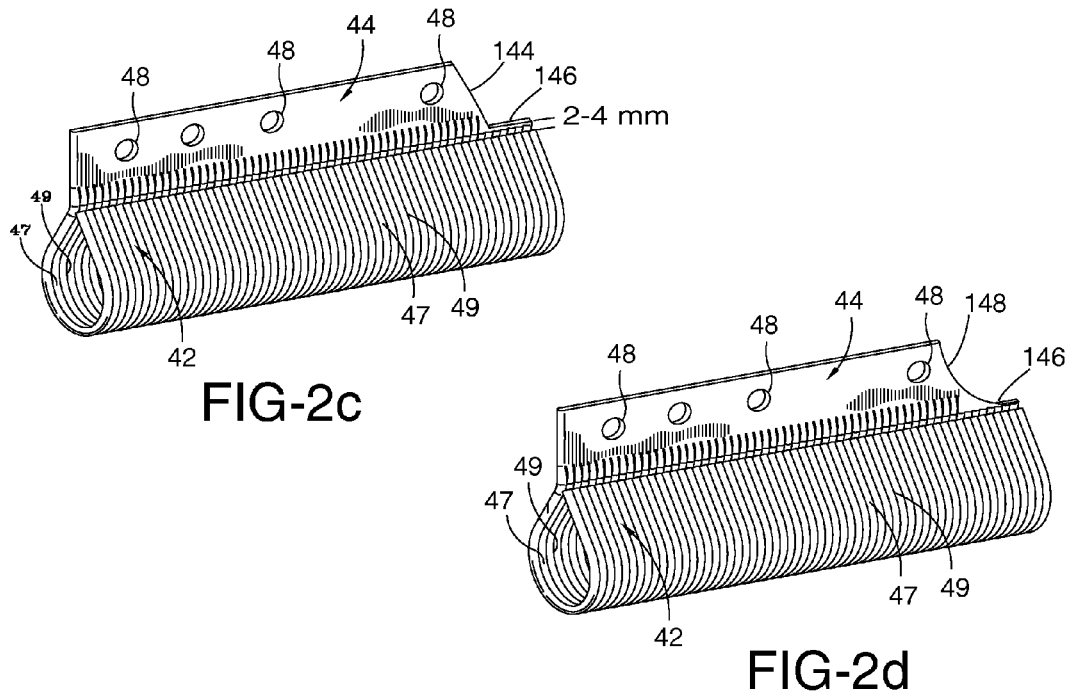
FIG-2c
FIG-2d

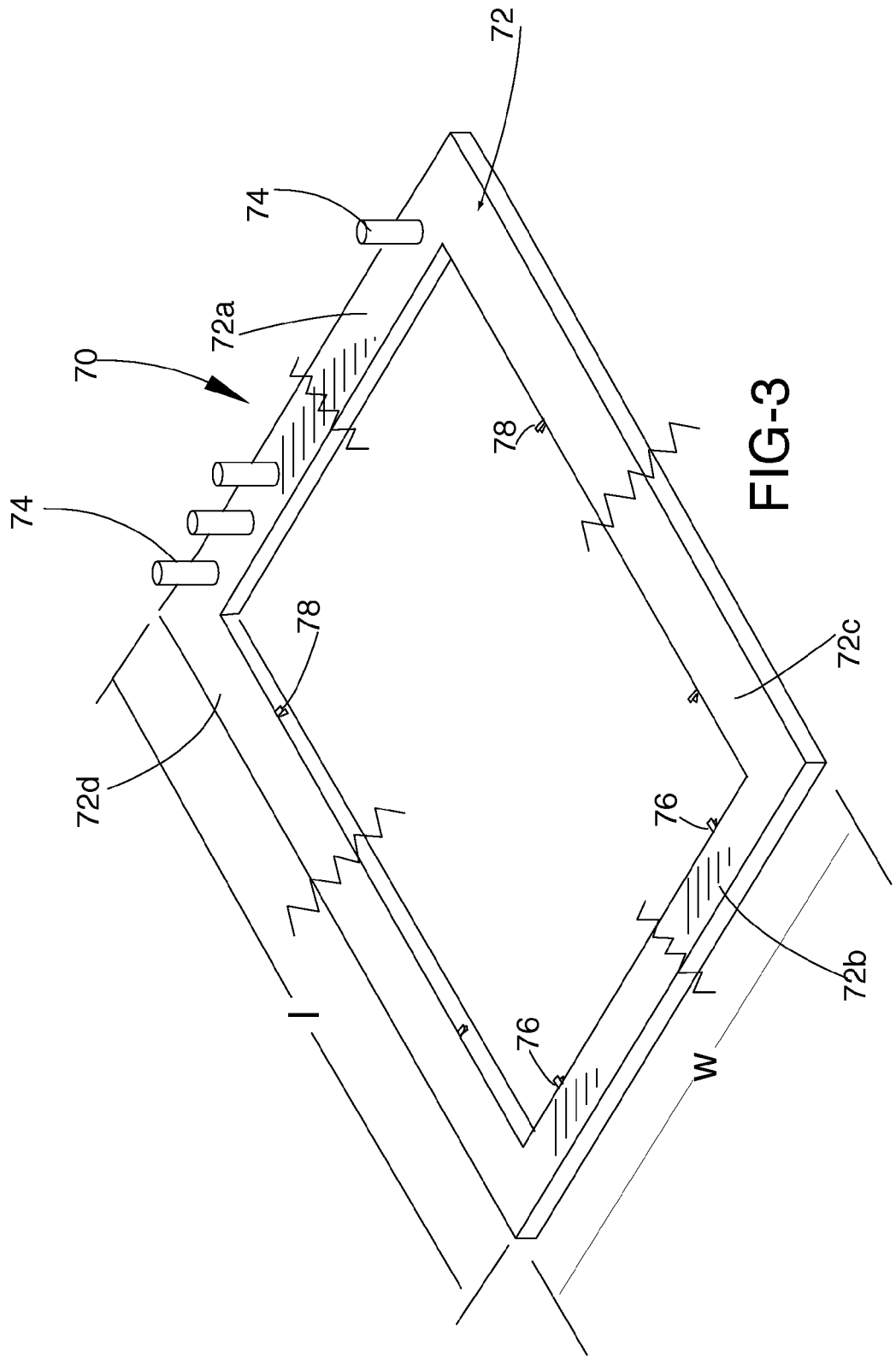

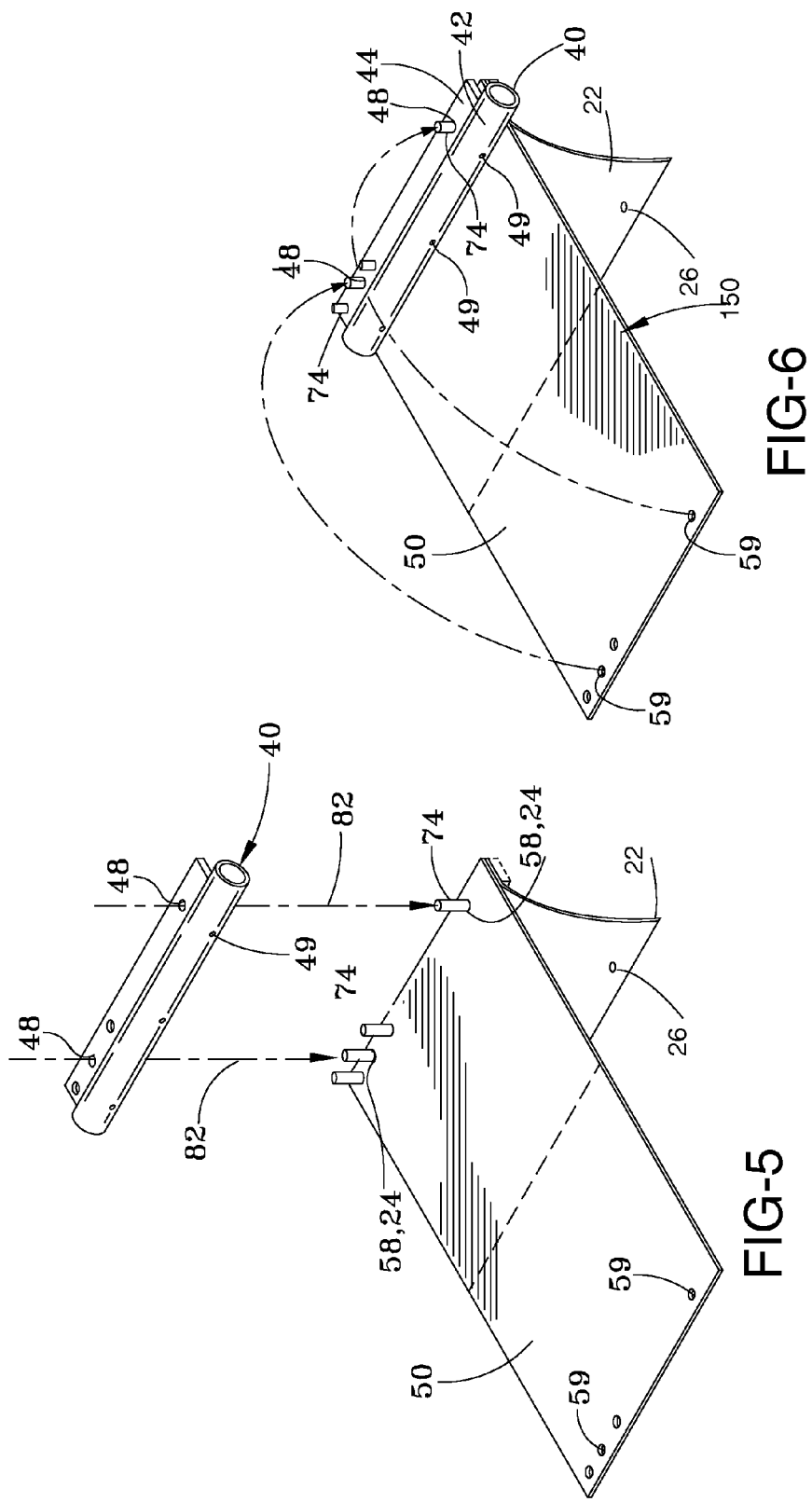

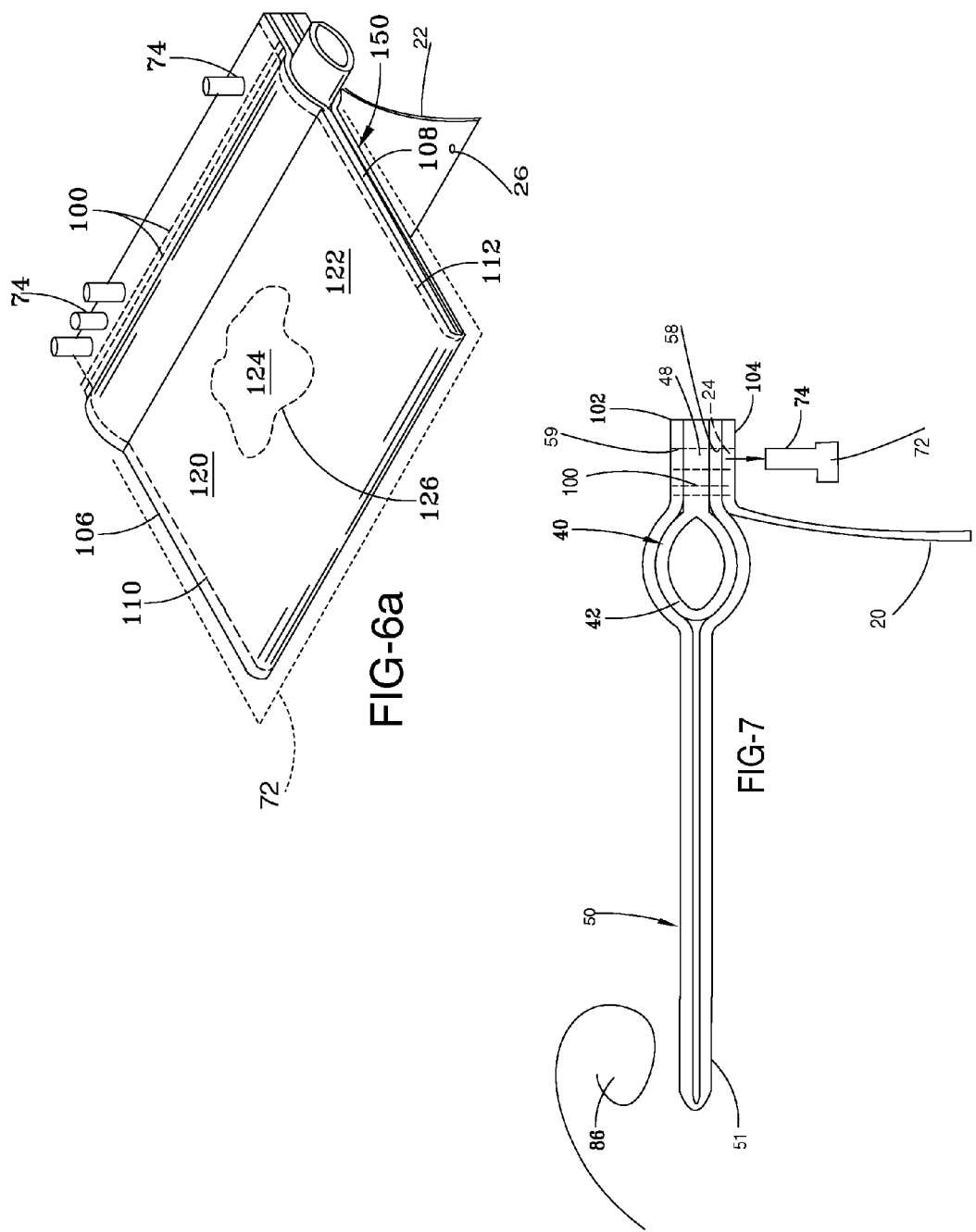

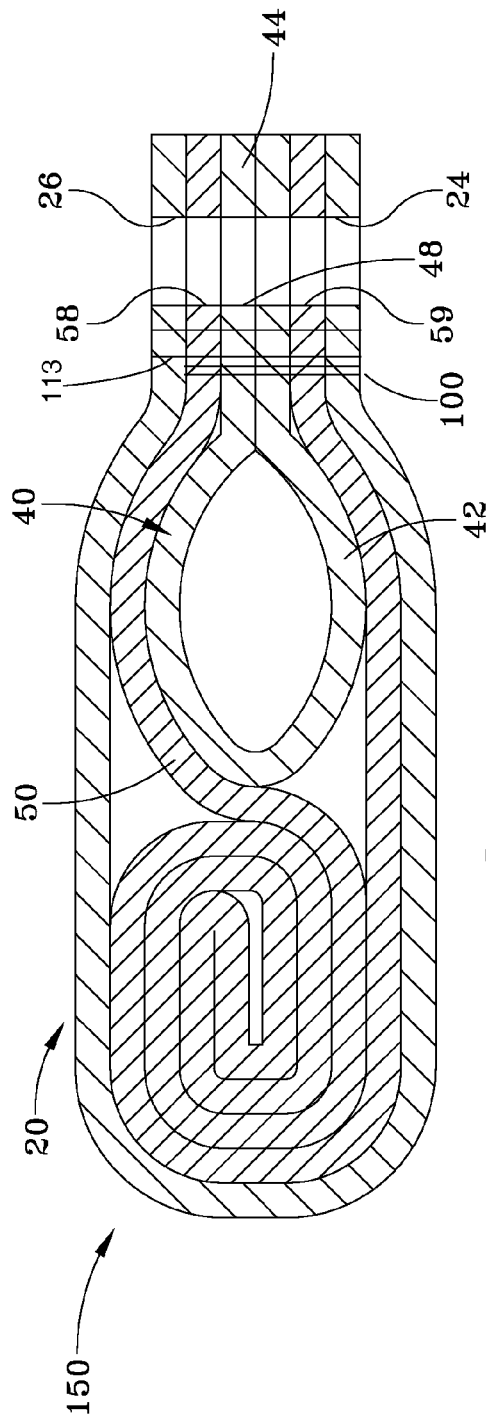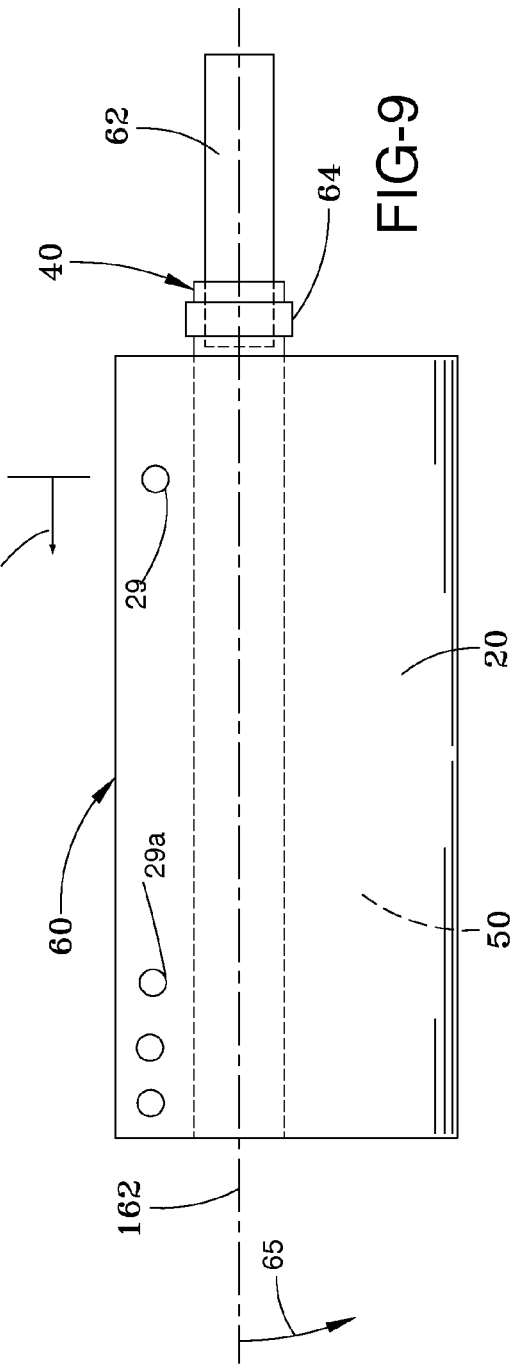

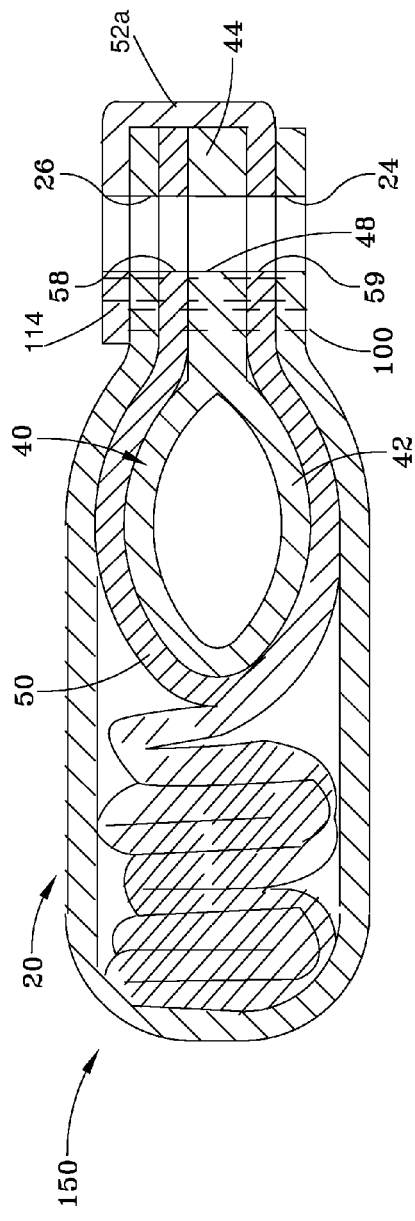
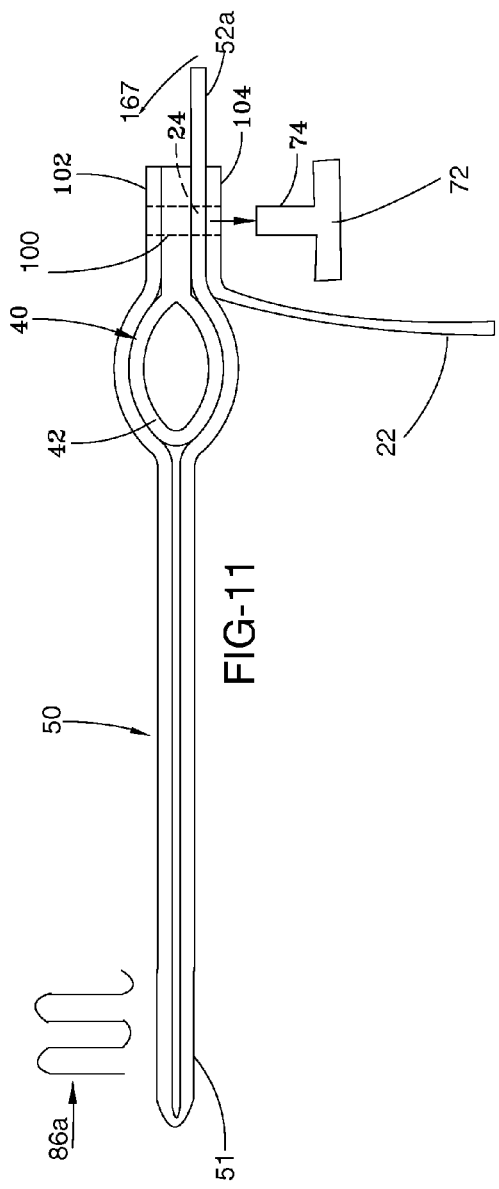
FIG-10
FIG-11

US 8,007,002 B2

AIR BAG WITH FILL HOSE AND METHOD OF ASSEMBLY

This application claims the benefit of U.S. Provisional Application 60/957,001, filed on Aug. 21, 2007. The disclosure of the above application is incorporated herein by reference.

BACKGROUND AND SUMMARY OF THE INVENTION

The present invention generally relates to air bags for safety restraint systems and more particularly to an air bag that incorporates a woven fill hose that has greater resistance to bending and twisting than shown in the prior art and one which facilitates mounting of the air bag to the vehicle.

Most curtain air bags in current production include one or more inflatable chambers formed by one or more panels of woven material constructed of nylon or polyester. The air bag is filled by an inflator of known variety. Many air bags utilize a distribution tube that extends from the inflator across the length of the air bag, typically at its top, to distribute inflation gas to various sections of the air bag; this distribution tube has been made of a metal tubing or alternatively by a flexible woven hose not unlike a fire hose. One of the benefits of utilizing rigid tubing is that the assembled module with folded air bag is relatively rigid because of the tube, and somewhat easier for the assembler to manipulate when installing the air bag module into a vehicle than the typical module using a flexible woven tube. Air bag modules that currently utilize a woven hose are more flexible than those modules utilizing rigid tubes and tend to droop and, as such, require a greater level of intervention and care during assembly by the assembler when installing this type of air bag module.

Reference is briefly made to FIGS. 1a-1c which illustrate some of the features of an existing curtain air bag module. In these figures the curtain air bag 202 has been folded and pulled into or placed within a cylindrically shaped, hollow, tearable, flexible cover 200. The cover 200 may be made from a woven piece of material, a non-woven material or other known construction. Mounting tabs 204 extend outwardly from the air bag through slits in the cover 200. Each tab includes a mounting hole 206, enabling the module to be mounted to a fastener such as hooks formed on the roof rail of the vehicle or, alternatively, attached to a roof rail using fasteners, such as bolts or screws that extend through the holes in the roof rail. FIG. 1b shows the module of FIG. 1a twisted one full turn, 360°, about its longitudinal axis. This twisting shortens the distance between adjacent tabs 204. As can be appreciated, twisting may restrict any gas flow passages in the air bag proximate the region being twisted. An air bag module in this condition should not be mounted to the vehicle in this manner. The mounting of a twisted module to the roof rail should not happen during assembly as many flexible covers such as 200 include a line or pattern or words generally noted as 208 and if this line or pattern is broken or interrupted, such as in FIG. 1b, the worker installing the module should recognize the module is twisted. In some situations the twisted module can still be mounted to the roof rail at the desired location as the extending, flexible tabs 204 might be sufficiently long that when stretched outwardly the module can still be mounted to the roof rail, see FIG. 1c. This and other deficiencies are corrected by the present invention.

The present invention includes a woven hose, devoid of extending tabs, which functions as a gas distribution tube. More particularly, the invention comprises: an air bag module including an inflatable air bag configured to receive a gas distribution hose therein, the gas distribution hose comprising a tubular portion and a flat portion integrally formed with the tubular portion, the tubular portion configured to receive inflation gas at one portion and having at least one opening therein to permit the egress of inflation gas; the flat portion of the hose located between the opposing edge borders of the facing panels of the air bag; and a seam or seams or a joint, or seal extends through a main panel and hose to join the hose between the edge borders of the main panel.

BRIEF DESCRIPTION OF THE DRAWINGS

FIG. 2 shows the major components of the present invention.

FIG. 2a graphically illustrates the resistance of the tube of the present invention to drooping, bending and twisting.

FIG. 2b is an isometric sketch of a hose for use with the present invention.

FIGS. 2c and 2d show an alternate embodiment of the invention.

FIG. 3 illustrates an assembly fixture usable with the present invention.

FIG. 5 illustrates a further step in the construction of the present invention.

FIG. 6 illustrates an additional step in the present invention.

FIG. 6a illustrates another step in the construction of the present invention.

FIG. 7 shows a process of folding the air bag.

FIG. 8 is a cross-sectional view showing a completed air bag.

FIG. 9 shows an air bag module incorporating the features of the present invention.

FIGS. 10 and 11 illustrate another embodiment of the invention.

DETAILED DESCRIPTION OF THE DRAWINGS

Figure 1A:
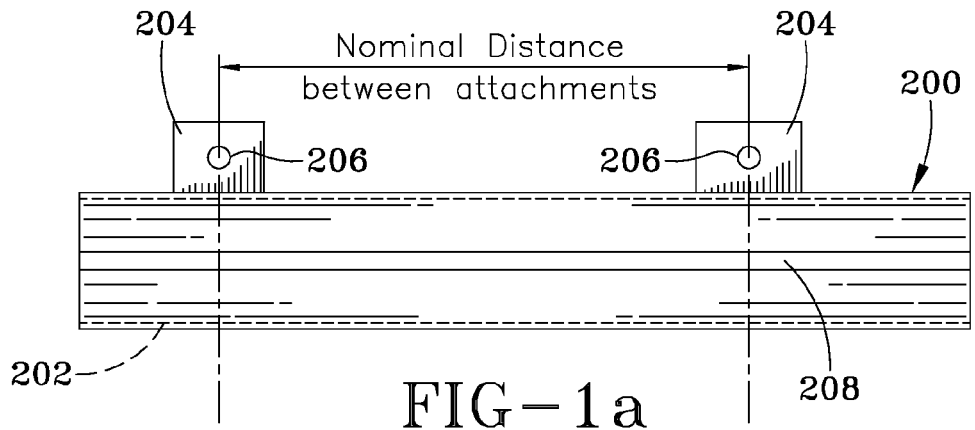
FIGS. 1a-1c show a series of figures in which a typical prior art curtain air bag is twisted about its longitudinal access.

Reference is now made to FIG. 2, which illustrates the major components of an air bag assembly 20 and air bag module 60 using the present invention. The assembly 20 includes a narrow, generally rectangular cover or cover panel 22, a hose 40 and air bag 50. The cover 22 has a top set of mounting openings 24 and a lower set of mounting openings 26. The cover is formed with a tear line 28. The cover can be constructed of a woven nylon, polyester or other material, or be made of a non-woven fabric or sheet of plastic, Tyvek or even paper. The basic purpose of the cover is to prevent the folded air bag 50 from unfolding; the cover also protects the air bag. A tear line has often been used in the art and can be formed by a line of perforations. In the illustrated embodiment of the invention the cover 22 is looped about the folded air bag.

The hose or tube 40 comprises a cylindrical or tubular section 42 and an integrally formed rectangular or generally flat or finned, or rib-like or ribbed section 44. Preferably, the tubular section and ribbed section are woven integrally together. The fin, rib or ribbed section 44 acts as a spine or backbone of the hose increasing its resistance to flexing about a center line or axis 46. The hose 40 also includes mounting openings 48 located in the ribbed section 44. The hose also includes one or more openings 49, which function as outlet ports to distribute the inflation gas to selective portions of the air bag. The openings 49 can be formed by physically cutting, laser cutting or melting the woven hose.

Air bag 50 includes a large or main panel 51 that can be thought as having a first panel half or section 52 and a second panel half or section 54, each section including mounting openings 58 or 59 along an edge or edge border. Numeral 56 illustrates a centerline which can also function as a fold line. As can be appreciated the main panel 51 can be replaced by two smaller panels that are secured together, for example, such as being joined along the centerline. Air bag module 60 includes the air bag assembly 20 as well as inflator 62 and a clamp 64 that connects the tube/hose 40 about an exit portion of the inflator 62 or, alternatively, to an optional intermediate tube 66 that interconnects hose 40 and inflator 62. The exit portion or orifices of the inflator is diagrammatically illustrated by one or more exit ports 68 that can be arranged to direct inflation gas to flow in an axial or radial manner as required by the installation. FIG. 2 also shows an alternate embodiment of the invention, in which the air bag 50 includes an extended section 52, the extended length or section identified as 52a having another set of mounting openings 59a. Each set of mounting openings 24, 26, 48, 58, 59 and 59a will generally overlap so that a fastener can extend through the aligned openings. The number of mounting openings as well as the spacing of openings will vary from vehicle to vehicle. As can be appreciated the various panels shown in FIG. 2 are not to scale and will also vary with the dimensions of the selected design of the air bag.

The primary use of the module 60 is as a curtain air bag module configured to be mounted to the roof rail of a vehicle and when inflated to protect the head and side of an occupant. Curtain air bags such as 50 will vary in width, w, from about 1 m (the approximate width of a vehicle window), to about 1.5 m (the approximate distance from an A-pillar to a B-pillar of a vehicle) to about 2-4 m, the distance from the A-pillar to the C or D pillars of the vehicle. The installed height of an inflated air bag will also vary. The height of the air bag in the context of FIG. 2 is one-half the length, l, of the main panel 51 and will extend from the roof rail to near the bottom of the window or lower and in general, will be in the range of about 0.4-0.7 m.

FIG. 2a is illustrative of the increased resistance to flexing, bending or increased rigidity achieved by the present invention. If for example, the hose 40 were oriented vertically and grasped and held in this position the hose would display less of a tendency, compared to a cylindrically shaped hose, to bend or droop downwardly in the direction of arrow 65 (for example, in this case, in a direction generally opposite to the y-axis of the coordinate system 63). This resistance to bending is attributed to the flat section, rib, spine or backbone 44 of the hose 40. This rigidity will further increase upon fabrication of the air bag assembly 20.

FIG. 2b diagrammatically shows the details of a section of hose 40, manufactured utilizing a Mutronic loom or weaving machine. In the illustrated embodiment, hose 40 is fabricated of woven polyester having a yarn denier of 1386; the weaving density of a cylindrical section is N×M and the weaving density of the rectangular section is 2N×2M, where N is the weave density in the fill direction and M is the weave density in the warp direction. In the illustrated embodiment the weave densities N and M are 75 and 85 respectively. Using the above construction the thickness of the ribbed section 44 is thicker than the tubular portion 42. A similar hose should be attainable using yarn deniers in the range of 1000-1500 and weave densities of N in the range of about 65-80 and M in the range of about 75-90. By integrally forming the cylindrical and rectangular sections, as mentioned above, the resulting hose and folded air bag subassembly has an increased resistance to flexing perpendicular to or twisting about the axis 162 (see FIG. 2a). In the illustrated embodiment the rectangular weave pattern of the rectangular section is a box weave. The tubular section is woven into a pattern of alternating ridges 47 and grooves 49.

Reference is briefly made to FIGS. 2a-2d. As mentioned above, the hose 40 is secured to the inflator 62 by a clamp 64. To provide an effective connection the corner of the ribbed section 44 proximate the clamp can be folded down and the clamp 64 applied over the folded-down corner. FIGS. 2c and 2d show alternate approaches; here a portion of the corner 44a (of FIG. 2b) is cut away; the resulting hose is shown in FIGS. 2c and 2d. The removal of a small portion of the ribbed section may make it easier and faster for the operator to move the clamp 64 in place and secure the hose to the inflator. In FIG. 2c the cut-away portion results in a straight-angled profile 144 that terminates in a straight border 146 in the remaining portions of the ribbed section. The border may be in the range of about 2-4 mm, with the length of the border of sufficient dimension to receive the clamp. In FIG. 2d, the cut-away portion results in a circular profile 148 that transitions to a flat border 146.

Reference is briefly made to FIG. 3, which illustrates an assembly fixture 70, which can be part of the frame of a quilting machine often utilized to manufacture quilts as well as air bags. The fixture 70 includes a frame 72 and a set of alignment pins 74 in a top portion 72a thereof. An opposing side or end 72b of the frame includes a set of clips 76, while the other sides 72c and 72d of the frame 72 include sets of clips 78. The zigzag lines crossing each side 72a-d, as well as the dimensions of width w, and length l, diagrammatically show the frame can be adjusted or built to accept an air bag of predetermined dimension. Further, the spacing between the pins 74 corresponds to the spacing between the various sets of openings in the cover 22, hose 40 and main panel 51. With the air bag material properly placed in the frame fixture, a sewing head (not shown) which is part of the assembly fixture 70 moves above the material, sewing parts of the panels 52, 54, cover and hose together.

Figure 4:
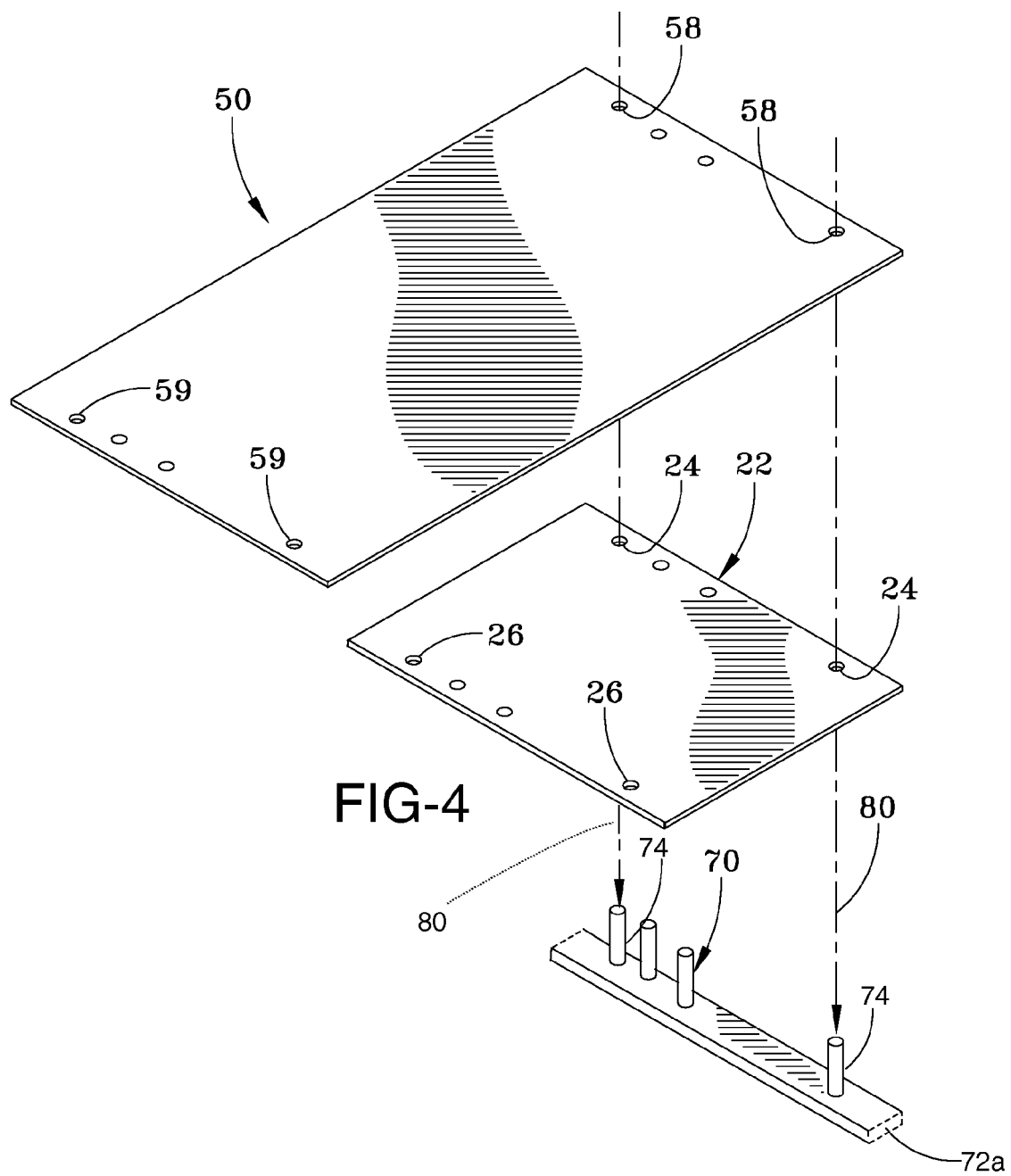
FIG. 4 illustrates a step in the construction of the present invention.

FIG. 4 shows initial steps in the manufacture of the air bag assembly 20. For purpose of illustration only the top side 72a of the fixture 70 is shown. The openings 24 in the cover are placed over the pins 74; similarly the openings 58 of the main panel 51 are then placed on the pins 74 on top of the cover 22. The cover 22 will at this time fall into the center of the frame 72 as illustrated in FIG. 5 which is typically open. Arrows 80 show the movement of the cover 22 and main panel 51 over the alignment pins 74.

FIG. 5 continues the assembly process; hose 40 is being placed upon panel 51 and manipulated so that its openings 48 are positioned over pins 74; arrows 82 illustrate the movement of hose 40 during this assembly step; the resulting subcombination 150 is shown in FIG. 6. In FIG. 6, the main panel 51 is shown being formed into a looped configuration whereby openings 59 in the main panel are manipulated to be placed over pins 74. As can be appreciated the hose 40 is now sandwiched between the panels or sections 52 and 54 of the main panel 51 and in particular border portions of these panels. With the main panel 51 and hose in the positions as described above, the folded-over main panel is secured to the remaining three sides of the frame 72. For example, the center of the main panel (see centerline 56) is held taut with clips 76 while the sides of panel 51 are held taut with clips 78. With panel 51 in place upon the frame 72, a plurality of seams 100, see FIGS. 6a and 7, is sewn through the now aligned top portions 102 and 104 of the main panel 51, the hose 40 and cover 22. In FIG. 6a, the other three sides of frame 72 are shown in dotted line. As can be seen from FIG. 7, seam 100 also extends from the top of the cover 22. Further, in FIG. 7, the air bag is spaced apart from the frame 72 for purpose of illustration.

The sewn seams 100 also extend through the ribbed section 44 of the hose 40, joining the ribbed section with the ends or borders of panel 51, adding to the overall stiffness of the final product. Subsequently, the folded-over panel 51, while being held in the frame 72 as described above, is now sewn together along opposing edges 106 and 108 of the main folded-over panel 51. Sewn seams 110 and 112 form panel 51 into the inflatable volume or air bag 50 capable of receiving and retaining inflation gas. Further, while these various panels are still on the quilting machine 70, additional features can be sewn into the air bag, dividing the air bag into one or more inflatable sections generally illustrated by numerals 120 and 122 as is common in the construction of curtain air bags. One such additional feature is also shown by 124, which is representative of a non-inflatable region of an air bag. Feature 124 is created by a seam 126 that extends through panels 52 and 54, which can be enclosed or slightly open to limit the flow of gas therein or prevent inflation gas from entering the interior thereof. As can be appreciated, the construction described for the air bag assembly 20 can be used for other air bags including a curtain air bag or passenger air bag, as well as a side impact air bag with various changes to the dimensions of the various constituent parts.

Reference is again made to FIG. 7, wherein the folded-over and sewn main panel 51 is folded over into a compact configuration. The curved lead line 86 is meant to convey the folding or rolling-over of panel 51. Panel 51 is folded or rolled into a compact configuration and positioned adjacent and typically below the cylindrical portion 42 of hose 40. FIG. 7 also shows the cover 22 still extending below the air bag 50 prior to itself being folded over the folded air bag. In FIG. 7 the cover 22 is still positioned below the panel 51 which is to be folded as described above and, for the purpose of illustration, pin 74 has been moved away from the air bag panels. Reference is briefly made to FIG. 8. In FIG. 8 the folded-over panel 51 is, as mentioned above, located adjacent the cylindrical section 42 of the hose and preferably the folded-over air bag 50 is tightly packaged against this portion of the hose. In FIG. 8 the cross-section of the tubular portion of the hose 40 is shown expanded for purpose of illustration when in actuality this portion will lie generally flat. When the air bag is mounted to the roof rail the folded-over or rolled-over portion is below the hose 40. Cover 22 has been manipulated so that it is looped about the folded air bag 50 and then its openings 26 are placed over pins 74. The pins will place openings 26 in alignment with the other openings 59, 48, 58 and 24. As can be appreciated, the longer the cover panel is, the looser it fits about the folded air bag. The length of the cover panel 20 is configured to hold the folded-over air bag generally close to the hose 40. Subsequently, one or more seams 113 are utilized to secure each of the portions of the cover 22, main panel 50 and hose 40 together. At this stage of assembly these various components are often called a bag-pack or air bag assembly 20. The completed air bag module 60 is shown diagrammatically in FIG. 9 in which inflator 62 is clamped by a clamp 64 to the hose 40. In this configuration one end of hose 40 is permitted to extend out of the cover 22 and main panel 51 to permit easy connection of a clamp-hose and inflator.

During assembly of the module 60 into the roof rail of the vehicle the assembler will often grab the module at a convenient location such as at the inflator 62 or near the middle of the assembly 20. The ribbed portion 44 of the hose 40, in combination with how the air bag and air bag assembly are constructed, provides an air bag assembly 20 with increased resistance to bending and twisting.

Figure 1B:
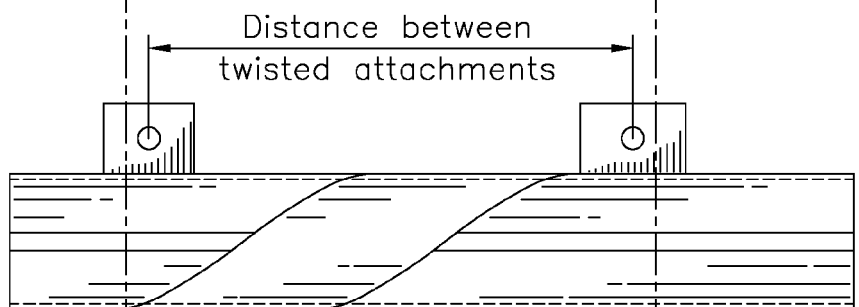
Figure 1C:
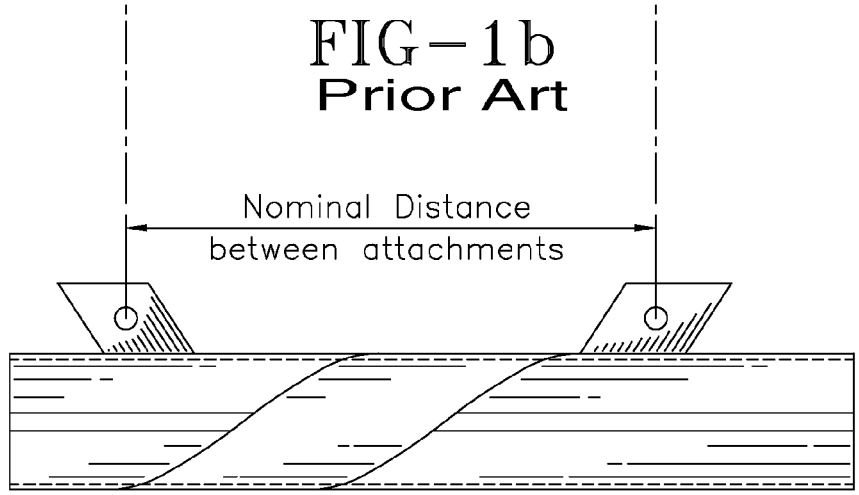

Reference is again made to FIGS. 1a-1c and to FIG. 9. As previously mentioned, if the prior art air bag assembly were twisted proximate the inflator (or for that matter at another location), the air bag assembly might still be able to be mounted to the roof rail as the extending tabs might be stretched outwardly to compensate for the reduction in length resulting from twisting the air bag assembly. In the construction of the present invention the air bag assembly 20 is highly resistant to being twisted. Even if the air bag assembly 20 were twisted into a configuration such as that shown in FIGS. 1a-1c resulting in a reduction in length between openings 26 and 26a (arrow 165 diagrammatically shows this reduction), it will be impossible to still mount the air bag assembly of the present invention to the roof rail because the mounting openings in the present invention are not placed upon extending tabs but on and through the ribbed portion 44 of the hose 40. The hose 40 as well as the compactly folded air bag assembly 20 cannot be stretched or otherwise manipulated to compensate for the reduction in length and still mounted to the roof rail.

Reference is briefly made to FIG. 2 as well as to FIGS. 10 and 11. In FIG. 2 the main panel 51 is shown with an optional extension designated by 52a. If the main panel included the extension 52a the openings 58 in the main panel 51 would, as described above, still be placed upon the pins 74. After this assembly step the extension 52a would extend beyond the frame 72. The construction of an air bag assembly with the extension 52a would proceed as described above following the steps used to construct the air bag assembly 20 that did not include the extension 52a. Reference is now made to FIGS. 10 and 11 which show a partially completed air bag assembly 20a in which the air bag has been or will be rolled or folded up and placed near to hose 40, and cover 22 wrapped about the folded air bag and secured to the frame. The air bag is shown being folded into a compact condition as opposed to being rolled. As can be seen from FIG. 11 the extension 52a remains in an extended position and the cover 22 hangs below the frame 72 (in the manner described above). After the air bag has been folded and the sides of cover 22 with openings 26 installed and wrapped above the folded air bag, the extension 52a is pulled in the direction of the arrow 167—over the top portions of the main panel 51, tube 240, and cover 22. Arrow 86a diagrammatically illustrates that the air bag can be folded, for example, in an accordion or other pleat. Thereafter, the extension 52a is sewn to the top portions of the panel, tube and cover, see seam 114. The addition of this added layer of material, that is, the extension 52a makes air bag assembly 20a even less prone to bending.

Many changes and modifications in the above-described embodiment of the invention can, of course, be carried out without departing from the scope thereof. Accordingly, that scope is intended to be limited only by the scope of the appended claims.

The invention claimed is:

1. An air bag module (60) comprising an inflatable air bag (50) having a first region formed by opposing borders (102, 104) of two facing panels or panel pieces (52, 54), the first region initially open to receive a gas distribution hose placed therebetween;

the gas distribution hose (40) comprising a tubular portion (42) with a wall and a flat portion (44) extending from the wall, the tubular portion and flat portion formed as a unit; the tubular portion configured to receive inflation gas at one portion and having openings (49) therein to permit the egress of inflation gas, the flat portion of the hose located between the opposing borders of the facing panels; and a seam or seams (100, 113, 114) extending through the facing borders to join the flat portion of the hose between the facing edge borders in a gas tight manner; and wherein one of the borders of the air bag includes an extending portion (52*a*) which extends outward further than the other border, the extending portion of the one border wrapped over an exposed edge of the tubular portion and the extending portion of the one border positioned adjacent and parallel to a portion of the cover and parallel with the other border and secured thereto.

2. The air bag module according to claim 1, further including a cover (22) wrapped about the air bag when the air bag is in a compact configuration, the cover including a first panel portion located between a first surface of the flat portion of the hose and a portion of the one border below the extending portion of the one border, the cover including a second panel portion located between a second surface of the flat portion of the hose, the second surface opposite the first surface, the wrapped-over portion of the one border also wrapped over and located on an outer side of the second panel of the cover.

* * * * *